(12) United States Patent
Nathan et al.

(10) Patent No.: US 8,661,477 B2
(45) Date of Patent: Feb. 25, 2014

(54) SYSTEM FOR DISTRIBUTING AND SELECTING AUDIO AND VIDEO INFORMATION AND METHOD IMPLEMENTED BY SAID SYSTEM

(75) Inventors: Guy Nathan, Yerres (FR); Tony Mastronardi, Pierrefonds (CA)

(73) Assignee: TouchTunes Music Corporation, New York, NY (US)

( * ) Notice: Subject to any disclaimer, the term of this patent is extended or adjusted under 35 U.S.C. 154(b) by 660 days.

(21) Appl. No.: 11/035,882

(22) Filed: Jan. 18, 2005

(65) Prior Publication Data

US 2005/0125833 A1 Jun. 9, 2005

Related U.S. Application Data

(63) Continuation of application No. 08/817,438, filed as application No. PCT/FR95/01338 on Oct. 12, 1995, now abandoned.

(30) Foreign Application Priority Data

Oct. 12, 1994 (WO) ........................ PCT/FR94/01185

(51) Int. Cl.
*H04N 7/173* (2011.01)
*H04N 5/445* (2011.01)
*H04N 7/10* (2006.01)
*H04N 7/025* (2006.01)

(52) U.S. Cl.
USPC ................. 725/82; 725/79; 725/92; 725/106; 379/93.26

(58) Field of Classification Search
USPC ........ 714/13, 15; 725/78, 82, 79, 61, 87, 106, 725/83, 92, 60; 379/93.26, 93.19, 93.28
See application file for complete search history.

(56) References Cited

U.S. PATENT DOCUMENTS

| | | | |
|---|---|---|---|
| 3,807,541 A | | 4/1974 | Kortenhaus |
| 3,982,620 A | | 9/1976 | Kortenhaus |
| 4,008,369 A | * | 2/1977 | Theurer et al. .................... 725/3 |
| 4,186,438 A | | 1/1980 | Benson et al. |

(Continued)

FOREIGN PATENT DOCUMENTS

| | | |
|---|---|---|
| AU | 199954012 | 4/2000 |
| DE | 3406058 | 8/1985 |

(Continued)

OTHER PUBLICATIONS

"High-speed Opens and Shorts Substrate Tester", IBM Technical Disclosure Bulletin, vol. 33, No. 12, May 1991, pp. 251-259.

(Continued)

*Primary Examiner* — Pankaj Kumar
*Assistant Examiner* — Reuben M Brown
(74) *Attorney, Agent, or Firm* — Nixon & Vanderhye PC

(57) ABSTRACT

A system for distributing and selecting audio and video information using a coaxial cable network includes a jukebox unit connected by a modulator to the cable television distribution network. A channel is allocated to the transmission of audio or video information. A device effects user interaction with the television for the remote selection of at least one audio or video information item from a plurality of information items to be transmitted by this channel using the cable network. An identifier identifies the ordering television, and a billing device accommodates for billing selections to the user.

15 Claims, 7 Drawing Sheets

(56) References Cited

U.S. PATENT DOCUMENTS

| | | | |
|---|---|---|---|
| 4,232,295 A | 11/1980 | McConnell | |
| 4,335,809 A | 6/1982 | Wain | |
| 4,335,908 A | 6/1982 | Burge | |
| 4,356,509 A | 10/1982 | Skerlos et al. | |
| 4,369,442 A | 1/1983 | Werth et al. | |
| 4,375,287 A | 3/1983 | Smith | |
| 4,412,292 A | 10/1983 | Sedam et al. | |
| 4,413,260 A | 11/1983 | Siegel et al. | |
| 4,521,014 A | 6/1985 | Sitrick | |
| 4,528,643 A | 7/1985 | Freeny, Jr. | |
| 4,558,413 A | 12/1985 | Schmidt | |
| 4,572,509 A | 2/1986 | Sitrick | |
| 4,577,333 A | 3/1986 | Lewis et al. | |
| 4,582,324 A | 4/1986 | Koza et al. | |
| 4,588,187 A | 5/1986 | Dell | |
| 4,593,904 A | 6/1986 | Graves | |
| 4,597,058 A | 6/1986 | Izumi et al. | |
| 4,636,951 A | 1/1987 | Harlick | |
| 4,652,998 A | 3/1987 | Koza et al. | |
| 4,654,799 A | 3/1987 | Ogaki et al. | |
| 4,658,093 A | 4/1987 | Hellman | |
| 4,667,802 A | 5/1987 | Verduin et al. | |
| 4,674,055 A | 6/1987 | Ogaki et al. | |
| 4,675,538 A | 6/1987 | Epstein | |
| 4,677,311 A | 6/1987 | Morita | |
| 4,677,565 A | 6/1987 | Ogaki | |
| 4,703,465 A | 10/1987 | Parker | |
| 4,704,725 A | 11/1987 | Harvey et al. | |
| 4,707,804 A | 11/1987 | Leal | |
| 4,722,053 A | 1/1988 | Dubno | |
| 4,761,684 A | 8/1988 | Clark et al. | |
| 4,766,581 A | 8/1988 | Korn et al. | |
| 4,787,050 A | 11/1988 | Suzuki | |
| 4,792,849 A | 12/1988 | McCalley | |
| 4,807,052 A | 2/1989 | Amano | |
| 4,811,325 A | 3/1989 | Sharples, Jr. et al. | |
| 4,814,972 A | 3/1989 | Winter et al. | |
| 4,825,054 A | 4/1989 | Rust | |
| 4,829,570 A | 5/1989 | Schotz | |
| 4,852,154 A * | 7/1989 | Lewis et al. | 379/93.12 |
| 4,857,714 A | 8/1989 | Sunyich | |
| 4,868,832 A | 9/1989 | Marrington | |
| 4,885,694 A | 12/1989 | Pray et al. | |
| 4,905,279 A | 2/1990 | Nishio | |
| 4,920,432 A | 4/1990 | Eggers | |
| 4,922,420 A | 5/1990 | Nakagawa et al. | |
| 4,924,378 A | 5/1990 | Hershey | |
| 4,926,485 A | 5/1990 | Yamashita | |
| 4,937,807 A | 6/1990 | Weitz et al. | |
| 4,949,187 A | 8/1990 | Cohen | |
| 4,953,159 A | 8/1990 | Hayden et al. | |
| 4,956,768 A | 9/1990 | Sidi et al. | |
| 4,958,835 A | 9/1990 | Tashiro et al. | |
| 4,977,593 A | 12/1990 | Ballance | |
| 4,999,806 A | 3/1991 | Chernow | |
| 5,008,814 A | 4/1991 | Mathur | |
| 5,012,121 A | 4/1991 | Hammond | |
| 5,027,426 A | 6/1991 | Chiocca | |
| 5,041,921 A | 8/1991 | Scheffler | |
| 5,046,093 A | 9/1991 | Wachob | |
| 5,053,758 A | 10/1991 | Cornett et al. | |
| 5,058,089 A | 10/1991 | Yoshimaru et al. | |
| 5,077,607 A | 12/1991 | Johnson et al. | |
| 5,081,534 A | 1/1992 | Geiger et al. | |
| 5,101,499 A | 3/1992 | Streck et al. | |
| 5,106,097 A | 4/1992 | Levine | |
| 5,117,407 A | 5/1992 | Vogel | |
| 5,138,712 A | 8/1992 | Corbin | |
| 5,148,159 A | 9/1992 | Clark et al. | |
| 5,155,847 A | 10/1992 | Kirouac | |
| 5,163,131 A | 11/1992 | Row | |
| 5,166,886 A | 11/1992 | Molnar | |
| 5,172,413 A | 12/1992 | Bradley et al. | |
| 5,180,309 A | 1/1993 | Egnor | |
| 5,189,630 A | 2/1993 | Barstow et al. | |
| 5,191,573 A | 3/1993 | Hair | |
| 5,191,611 A | 3/1993 | Lang | |
| 5,192,999 A | 3/1993 | Graczyk | |
| 5,197,094 A | 3/1993 | Tillery | |
| 5,203,028 A | 4/1993 | Shiraishi | |
| 5,210,854 A | 5/1993 | Beaverton et al. | |
| 5,214,761 A | 5/1993 | Barrett et al. | |
| 5,222,134 A | 6/1993 | Waite et al. | |
| 5,228,015 A | 7/1993 | Arbiter et al. | |
| 5,236,199 A * | 8/1993 | Thompson, Jr. | 463/41 |
| 5,237,157 A | 8/1993 | Kaplan | |
| 5,237,322 A | 8/1993 | Heberle | |
| 5,239,480 A | 8/1993 | Huegel | |
| 5,250,747 A | 10/1993 | Tsumura | |
| 5,252,775 A | 10/1993 | Urano | |
| 5,260,999 A | 11/1993 | Wyman | |
| 5,261,104 A | 11/1993 | Bertram et al. | |
| 5,262,875 A | 11/1993 | Mincer et al. | |
| 5,276,866 A | 1/1994 | Paolini | |
| 5,278,904 A | 1/1994 | Servi | |
| 5,282,028 A | 1/1994 | Johnson et al. | |
| 5,289,476 A | 2/1994 | Johnson et al. | |
| 5,289,546 A | 2/1994 | Hetherington | |
| 5,315,161 A | 5/1994 | Robinson | |
| 5,315,711 A | 5/1994 | Barone et al. | |
| 5,319,455 A | 6/1994 | Hoarty et al. | |
| 5,321,846 A | 6/1994 | Yokota et al. | |
| 5,327,230 A | 7/1994 | Dockery | |
| 5,335,313 A * | 8/1994 | Douglas | 704/275 |
| 5,339,095 A | 8/1994 | Redford | |
| 5,339,413 A | 8/1994 | Koval | |
| 5,341,350 A | 8/1994 | Frank et al. | |
| 5,355,302 A | 10/1994 | Martin et al. | |
| 5,357,276 A | 10/1994 | Banker | |
| 5,369,778 A | 11/1994 | SanSoucie | |
| 5,375,206 A | 12/1994 | Hunter et al. | |
| 5,383,112 A * | 1/1995 | Clark | 705/7.12 |
| 5,386,251 A | 1/1995 | Movshovich | |
| 5,389,950 A | 2/1995 | Bouton | |
| 5,404,505 A | 4/1995 | Levinson | |
| 5,406,634 A | 4/1995 | Anderson et al. | |
| 5,408,417 A | 4/1995 | Wilder | |
| 5,410,326 A | 4/1995 | Goldstein | |
| 5,410,703 A | 4/1995 | Nilsson et al. | |
| 5,418,713 A | 5/1995 | Allen | |
| 5,420,923 A | 5/1995 | Beyers | |
| 5,428,252 A | 6/1995 | Walker | |
| 5,428,606 A | 6/1995 | Moskowitz | |
| 5,431,492 A | 7/1995 | Rothschild | |
| 5,440,632 A | 8/1995 | Bacon et al. | |
| 5,444,499 A | 8/1995 | Saitoh | |
| 5,445,295 A | 8/1995 | Brown | |
| 5,455,619 A | 10/1995 | Truckenmiller et al. | |
| 5,455,926 A | 10/1995 | Keele | |
| 5,457,305 A | 10/1995 | Akel | |
| 5,465,213 A | 11/1995 | Ross | |
| 5,467,326 A | 11/1995 | Miyashita et al. | |
| 5,469,370 A | 11/1995 | Ostrover et al. | |
| 5,469,573 A | 11/1995 | McGill et al. | |
| 5,471,576 A | 11/1995 | Yee | |
| 5,475,835 A | 12/1995 | Hickey | |
| 5,481,509 A | 1/1996 | Knowles | |
| 5,487,167 A | 1/1996 | Dinallo et al. | |
| 5,489,103 A | 2/1996 | Okamoto | |
| 5,495,610 A | 2/1996 | Shing | |
| 5,496,178 A | 3/1996 | Back | |
| 5,499,921 A | 3/1996 | Sone | |
| 5,511,000 A | 4/1996 | Kaloi | |
| 5,513,117 A | 4/1996 | Small | |
| 5,515,173 A | 5/1996 | Mankovitz et al. | |
| 5,519,435 A | 5/1996 | Anderson | |
| 5,519,457 A | 5/1996 | Nishigaki et al. | |
| 5,521,631 A * | 5/1996 | Budow et al. | 725/78 |
| 5,521,918 A | 5/1996 | Kim | |
| 5,521,922 A | 5/1996 | Fujinami et al. | |
| 5,523,781 A * | 6/1996 | Brusaw | 725/151 |
| 5,528,732 A | 6/1996 | Klotz | |
| 5,532,734 A | 7/1996 | Goertz | |
| 5,537,143 A * | 7/1996 | Steingold et al. | 725/119 |

(56) References Cited

U.S. PATENT DOCUMENTS

| | | |
|---|---|---|
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,561,709 A | 10/1996 | Remillard |
| 5,565,908 A * | 10/1996 | Ahmad .......................... 725/93 |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,592,482 A * | 1/1997 | Abraham ......................... 725/79 |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankovitz |
| 5,708,811 A | 1/1998 | Arendt |
| 5,712,976 A | 1/1998 | Falcon |
| 5,713,024 A | 1/1998 | Halladay |
| 5,715,416 A | 2/1998 | Baker |
| 5,717,452 A * | 2/1998 | Janin et al. .................... 725/131 |
| 5,721,583 A | 2/1998 | Harada et al. |
| 5,721,815 A | 2/1998 | Ottesen et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos |
| 5,734,961 A | 3/1998 | Castille |
| 5,739,451 A | 4/1998 | Winksy et al. |
| 5,743,745 A | 4/1998 | Reintjes |
| 5,745,391 A * | 4/1998 | Topor ............................ 713/321 |
| 5,748,254 A | 5/1998 | Harrison et al. |
| 5,748,468 A | 5/1998 | Notenboom et al. |
| 5,751,336 A | 5/1998 | Aggarwal et al. |
| 5,752,232 A * | 5/1998 | Basore et al. ................. 704/275 |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choqiuer |
| 5,774,672 A | 6/1998 | Funahashi |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,193 A | 3/1999 | Takahashi |
| 5,896,094 A | 4/1999 | Narisada et al. |
| 5,903,266 A | 5/1999 | Berstis et al. |
| 5,913,040 A | 6/1999 | Rakavy |
| 5,914,712 A * | 6/1999 | Sartain et al. ..................... 725/9 |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Bleidt et al. |
| 5,923,885 A | 7/1999 | Johnson |
| 5,926,531 A | 7/1999 | Petite |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,963,916 A | 10/1999 | Kaplan |
| 5,966,495 A | 10/1999 | Takahashi |
| 5,978,855 A | 11/1999 | Metz |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |

(56) References Cited

U.S. PATENT DOCUMENTS

| | | |
|---|---|---|
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,025,868 A | 2/2000 | Russo |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,054,987 A | 4/2000 | Richardson |
| 6,055,573 A | 4/2000 | Gardenswartz et al. |
| 6,057,874 A | 5/2000 | Michaud |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,227 B1 | 4/2001 | Goldstein et al. |
| 6,219,692 B1 | 4/2001 | Stiles |
| 6,223,209 B1 | 4/2001 | Watson |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Owens et al. |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,356,971 B1 | 3/2002 | Katz et al. |
| 6,359,661 B1 | 3/2002 | Nickum |
| 6,370,580 B2 | 4/2002 | Kriegsman |
| 6,381,575 B1 | 4/2002 | Martin et al. |
| 6,384,737 B1 | 5/2002 | Hsu et al. |
| 6,393,584 B1 * | 5/2002 | McLaren et al. ................ 714/14 |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,130 B1 | 9/2002 | Grapes |
| 6,449,688 B1 | 9/2002 | Peters et al. |
| 6,470,496 B1 | 10/2002 | Kato et al. |
| 6,488,508 B2 | 12/2002 | Okamoto |
| 6,490,570 B1 | 12/2002 | Numaoka |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,789,215 B1 | 9/2004 | Rupp et al. |
| 6,816,578 B1 | 11/2004 | Kredo et al. |
| 6,898,161 B1 | 5/2005 | Nathan |
| 6,904,592 B1 | 6/2005 | Johnson |
| 6,928,653 B1 | 8/2005 | Ellis et al. |
| 6,942,574 B1 | 9/2005 | LeMay et al. |
| 6,974,076 B1 | 12/2005 | Siegel |
| 7,024,485 B2 | 4/2006 | Dunning et al. |
| 7,107,109 B1 | 9/2006 | Nathan et al. |
| 7,124,194 B2 | 10/2006 | Nathan et al. |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,293,277 B1 | 11/2007 | Nathan |
| 7,356,831 B2 | 4/2008 | Nathan |
| 7,406,529 B2 | 7/2008 | Reed |
| 7,424,731 B1 | 9/2008 | Nathan et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,549,919 B1 | 6/2009 | Nathan et al. |
| 7,574,727 B2 | 8/2009 | Nathan et al. |
| 7,647,613 B2 | 1/2010 | Drakoulis et al. |
| 7,749,083 B2 | 7/2010 | Nathan et al. |
| 7,757,264 B2 | 7/2010 | Nathan |
| 7,783,774 B2 | 8/2010 | Nathan et al. |
| 7,793,331 B2 | 9/2010 | Nathan et al. |
| 2001/0016815 A1 | 8/2001 | Takahashi et al. |
| 2001/0023403 A1 | 9/2001 | Martin et al. |

(56) References Cited

U.S. PATENT DOCUMENTS

| | | | |
|---|---|---|---|
| 2001/0030660 A1 | 10/2001 | Zainoulline | |
| 2001/0037367 A1 | 11/2001 | Iyer | |
| 2001/0044725 A1 | 11/2001 | Matsuda et al. | |
| 2002/0002079 A1 | 1/2002 | Martin et al. | |
| 2002/0002483 A1 | 1/2002 | Siegel et al. | |
| 2002/0113824 A1 | 8/2002 | Myers | |
| 2002/0116476 A1 | 8/2002 | Eyal et al. | |
| 2002/0118949 A1 | 8/2002 | Jones et al. | |
| 2002/0120925 A1 | 8/2002 | Logan | |
| 2002/0129036 A1 | 9/2002 | Ho Yuen Lok et al. | |
| 2002/0162104 A1 | 10/2002 | Raike et al. | |
| 2003/0005099 A1 | 1/2003 | Sven et al. | |
| 2003/0008703 A1 | 1/2003 | Gauselmann | |
| 2003/0018740 A1 | 1/2003 | Sonoda et al. | |
| 2003/0031096 A1 | 2/2003 | Nathan et al. | |
| 2003/0041093 A1 | 2/2003 | Yamane et al. | |
| 2003/0065639 A1 | 4/2003 | Fiennes et al. | |
| 2003/0088538 A1 | 5/2003 | Ballard | |
| 2003/0093790 A1 | 5/2003 | Logan et al. | |
| 2003/0101450 A1 | 5/2003 | Davidsson et al. | |
| 2003/0104865 A1 | 6/2003 | Itkis et al. | |
| 2003/0108164 A1 | 6/2003 | Laurin et al. | |
| 2003/0135424 A1 | 7/2003 | Davis et al. | |
| 2003/0208586 A1 | 11/2003 | Mastronardi et al. | |
| 2003/0225834 A1 | 12/2003 | Lee et al. | |
| 2004/0025185 A1 | 2/2004 | Goci et al. | |
| 2004/0085334 A1 | 5/2004 | Reaney | |
| 2004/0103150 A1 | 5/2004 | Ogdon et al. | |
| 2004/0204220 A1 | 10/2004 | Fried et al. | |
| 2004/0220926 A1 | 11/2004 | Lamkin et al. | |
| 2005/0060405 A1 | 3/2005 | Nathan et al. | |
| 2005/0073782 A1 | 4/2005 | Nathan | |
| 2005/0086172 A1 | 4/2005 | Stefik | |
| 2005/0125833 A1* | 6/2005 | Nathan et al. | 725/95 |
| 2005/0267819 A1 | 12/2005 | Kaplan | |
| 2006/0018208 A1 | 1/2006 | Nathan et al. | |
| 2006/0035707 A1 | 2/2006 | Nguyen et al. | |
| 2006/0062094 A1 | 3/2006 | Nathan et al. | |
| 2006/0239131 A1 | 10/2006 | Nathan et al. | |
| 2006/0293773 A1 | 12/2006 | Nathan et al. | |
| 2007/0121430 A1 | 5/2007 | Nathan | |
| 2007/0142022 A1 | 6/2007 | Madonna et al. | |
| 2007/0160224 A1 | 7/2007 | Nathan | |
| 2007/0204263 A1 | 8/2007 | Nathan et al. | |
| 2007/0209053 A1 | 9/2007 | Nathan | |
| 2007/0247979 A1 | 10/2007 | Brillon et al. | |
| 2008/0069545 A1 | 3/2008 | Nathan et al. | |
| 2008/0077962 A1 | 3/2008 | Nathan | |
| 2008/0086379 A1 | 4/2008 | Dion et al. | |
| 2008/0096659 A1 | 4/2008 | Kreloff et al. | |
| 2008/0137849 A1 | 6/2008 | Nathan | |
| 2008/0168807 A1 | 7/2008 | Dion et al. | |
| 2008/0171594 A1 | 7/2008 | Fedesna et al. | |
| 2008/0195443 A1 | 8/2008 | Nathan et al. | |
| 2008/0239887 A1 | 10/2008 | Tooker et al. | |
| 2009/0037969 A1 | 2/2009 | Nathan et al. | |
| 2009/0070341 A1 | 3/2009 | Mastronardi et al. | |
| 2009/0138111 A1 | 5/2009 | Mastronardi | |
| 2009/0265734 A1 | 10/2009 | Dion et al. | |
| 2009/0282491 A1 | 11/2009 | Nathan | |
| 2010/0042505 A1 | 2/2010 | Straus | |
| 2010/0211818 A1 | 8/2010 | Nathan et al. | |

FOREIGN PATENT DOCUMENTS

| | | |
|---|---|---|
| DE | 3723737 A1 | 1/1988 |
| DE | 3820835 A1 | 1/1989 |
| DE | A3820835 | 1/1989 |
| DE | 3815071 | 11/1989 |
| DE | 4 244 198 | 6/1994 |
| DE | 19610739 | 9/1997 |
| DE | 19904007 | 8/2000 |
| EP | A0082077 | 6/1983 |
| EP | 0140593 A2 | 5/1985 |
| EP | 0256921 | 2/1988 |
| EP | 0283304 | 9/1988 |
| EP | A0283350 | 9/1988 |
| EP | 0 309 298 | 3/1989 |
| EP | A0313359 | 4/1989 |
| EP | 0340787 | 11/1989 |
| EP | 0363186 | 4/1990 |
| EP | 0 397 908 | 11/1990 |
| EP | 0 425 168 A | 5/1991 |
| EP | 0464562 A2 | 1/1992 |
| EP | 0480558 | 4/1992 |
| EP | 0498130 | 8/1992 |
| EP | 0498130 A2 | 8/1992 |
| EP | 0 507 110 | 10/1992 |
| EP | 0529834 | 3/1993 |
| EP | 0538319 B1 | 4/1993 |
| EP | A0631283 | 12/1994 |
| EP | 0632371 | 1/1995 |
| EP | 0711076 | 5/1996 |
| EP | 0786122 B1 | 7/1997 |
| EP | 0817103 | 1/1998 |
| EP | 0841616 A2 | 5/1998 |
| EP | 0919964 | 6/1999 |
| EP | 0959570 A1 | 11/1999 |
| EP | 0 974 896 A1 | 1/2000 |
| EP | 0974941 | 1/2000 |
| EP | 0982695 | 3/2000 |
| EP | 1001391 | 5/2000 |
| EP | 1408427 | 4/2004 |
| EP | 0 974 941 | 5/2006 |
| FR | A2602352 | 2/1988 |
| FR | 2808906 | 11/2001 |
| GB | A 2122799 | 1/1984 |
| GB | 2166328 A | 4/1986 |
| GB | 2170943 | 8/1986 |
| GB | 2193420 | 2/1988 |
| GB | A 2193420 | 2/1988 |
| GB | 2 238 680 A | 6/1991 |
| GB | 2254469 | 10/1992 |
| GB | 2259398 | 3/1993 |
| GB | A2259398 | 3/1993 |
| GB | 2262170 A | 6/1993 |
| GB | 2380377 | 4/2003 |
| JP | 57-173207 | 10/1982 |
| JP | 58-179892 | 10/1983 |
| JP | 60-253082 | 12/1985 |
| JP | 61-084143 | 4/1986 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5122282 | 5/1993 |
| JP | 5-74078 | 10/1993 |
| JP | 07281682 | 10/1995 |
| JP | 08-279235 | 10/1996 |
| JP | 8274812 | 10/1996 |
| JP | 10-098344 | 4/1998 |
| WO | WO 86 01326 A | 2/1986 |
| WO | A9007843 | 7/1990 |
| WO | WO 91/08542 | 6/1991 |
| WO | A 9120082 | 12/1991 |
| WO | WO 93/16557 | 8/1993 |
| WO | A 9318465 | 9/1993 |
| WO | A94 03894 | 2/1994 |
| WO | WO 94/14273 | 6/1994 |
| WO | WO 94/15306 | 7/1994 |
| WO | WO 94 15416 A | 7/1994 |
| WO | WO 95 03609 A | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96 12258 A | 4/1996 |
| WO | WO 98/07940 | 2/1998 |
| WO | WO 98/45835 | 10/1998 |
| WO | WO 01/00290 | 1/2001 |

(56) References Cited

FOREIGN PATENT DOCUMENTS

| WO | WO 01/08148 | 2/2001 |
|---|---|---|
| WO | WO 02/095752 | 11/2002 |
| WO | WO 2006/014739 | 2/2006 |

OTHER PUBLICATIONS

Bonczck, Robert H. et al, "The DSS Development System", 1983 National Computer Conference, Anaheim, California, May 16-19, 1983, pp. 441-455.
IBM Technical Disclosure Bulletin, vol. 30, No. 5, Oct. 1987, "Method for Automated Assembly of Software Versions", pp. 353-355.
"Robotic Wafer Handling System for Class 10 Environments" IBM Technical Disclosure Bulletin, vol. 32, No. 9A, Feb. 1990, pp. 141-143.
"Darts Revolution Again", Replay Magazine, Mar. 1991, pp. 146-148.
Galen A. Grimes, "Chapter 18, Taking Advantage or Web-based Audio."
Petri Koskelainem "Report on Streamworks™".
W. Richard Stevens, "TCP/IP Illustrated: vol. 1, the Protocols".
Nowell Outlaw "Virtual Servers Offer Performance benefits for Networks Imaging".
"Ecast Forges Landmark International Technology Partnership", Business Wire at www.findarticles.com/cf_0/m0EIN/2000_July_25/63663604/print.jhtml, 2 pages, Jul. 25, 2000.
"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.
Derfler et al., "How Networks Work", Millennium Ed., Que Corporation, Jan. 2000.
European Search Report from EP 1 993 079.
European Search Report issued for European Application No. 08000845.1-1238/1962251, dated Apr. 3, 2009.
Gralla, "How the Internet Works", Millennium Ed., Que Corporation, Aug. 1999.
Hicks et al., "Dynamic software updating" ACM PLDI, pp. 13-23, 2001.
iTOUCH 27 New Games brochure, JVL Corporation, 2005, 2 pages.
iTouch 8 Plus brochure, JVL Corporation, 2005, 2 pages.
Kozierok, The PC Guide, Site Version 2.2.0, http://www.pcguide.com, Apr. 17, 2001.
Liang et al., "Dynamic class loading in the Java virtual machine", ACM OOPSLA, pp. 36-44, 1998.
Look and iTouch brochure, JVL Corporation, 2004, 2 pages.
Megatouch Champ brochure, Merit Industries, Inc., 2005, 2 pages.
Melnik et al., "A mediation infrastructure for digital library services", ACM DL, pp. 123-132, 2000.
Mod Box Internet brochure, Merit Entertainment, 2006, 2 pages.
Newsome et al., "Proxy compilation of dynamically loaded java classes with MoJo", ACM LCTES, pp. 204-212, 2002.
Patent Abstract of Japan vol. 95, No. 010 & JP 07 281682 A (Naguo Yuasa), Oct. 27 1 JP 07 281682, figure 1-6 abrége.
Schneier, "Applied Cryptography", Second Edition, John Wiley & Sons, Inc. New York, 1996.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, (Sep. 22, 1999).

* cited by examiner

SYSTEM FOR DISTRIBUTING AND SELECTING AUDIO AND VIDEO INFORMATION AND METHOD IMPLEMENTED BY SAID SYSTEM This application is a continuation of application Ser. No. 08/817,438, filed Oct. 2, 1997 now abandoned, the entire content of which is hereby incorporated by reference in this application.

BACKGROUND OF THE INVENTION

1. Field of the Invention

This invention relates to a system for distributing and selecting audio or video information on a network and the method implemented by this system.

2. Description of Related Art

British patent 2166328 discloses a device which distributes audio or video information over a coaxial cable network requiring a specific bus of the ISDN type comprising a telephone network and a communications bus for the other devices, with the communications bus containing remote control boxes, each linked to an adapter device connected to the bus.

A network such as this has the drawback that it requires wiring of several networks, first coaxial type wiring, second wiring for the ISDN-type telephone network, and finally third wiring for the communications control bus.

Another patent application, European patent no. 140493, circumvents these drawbacks by using only the coaxial network to distribute audio information originating from a jukebox unit, using on the cable network at least one channel allocated to transmission of audio information. This channel is divided into subchannels and each audio selection is frequency-multiplexed. Thus 75 to 200 audio channels are sent over a video channel with a bandwidth of 6 MHz. A conversion box makes it possible to select each of the subchannels and thus for the user to hear the song carried by this subchannel. The drawback of a system such as this is that the user cannot determine the beginning and the end of the song, since all the selections are played without interruption, and the waiting time can be up to 30 seconds. Another drawback of this system design is that it is not possible to simultaneously transmit video and audio information. In fact, in order to transmit video information the primary carrier of each channel must be taken, and in this case, per channel it will no longer be possible to transmit more than one video information item associated with one or two audio information items of acceptable quality, among which one of these two audio information items corresponds to the one associated with the video information. Thus, in order to transmit video information corresponding to 200 selections, the saturation point would soon be reached and all available channels would be occupied. In this case, transmission of television channels would no longer be possible and in any case the number of audio information items will be less than 10.

SUMMARY OF THE INVENTION

The object of the invention is therefore to devise a system for distributing and selecting audio or video information on a coaxial cable network without hindering distribution of television programs on this cable network and while simultaneously allowing distribution of video data corresponding to selections available on a jukebox unit. The object of the system is also to allow interactive communication between the user and the available selections without having to specially wire the premises equipped with the system by using networks which would normally already exist on the premises.

This object is achieved with a system for distributing and selecting audio and video information over a coaxial cable network having in association a jukebox unit connected by a modulator to this cable television distribution network. A channel is allocated for the transmission of audio or video information. The system also includes structure for interacting with the television for remote selection of at least one audio or video information item from the plurality of information items to be transmitted over the cable network; structure for identifying the selection device or the television set linked to the selection device; and structure for billing the user linked to a television set for the selections made.

According to another feature, the selection device includes the telephone network and the connected exchange of the PABX type which delivers to the interface of the jukebox voice frequency signals used by interface software incorporated in the jukebox to interpret the pushing of buttons on a telephone set as mouse events affecting movement of a cursor on screen windows for guiding the user. These signals also contain identification information.

According to another feature, voice assistance structure is provided to guide the user in pushing the telephone set buttons.

According to another feature, the selection device includes a controller connected by the electrical network to an appropriate interface of the jukebox. The interface and selection device both operate on the principle of carrier streams to transmit a piece of identification information and control data corresponding to the pushing of control buttons.

According to another feature, the jukebox has a mass storage, a primary processor operating a multitask system, a video controller circuit and an audio controller circuit belonging to the cable network. The video and audio controller circuits are connected to an RF radio frequency modulator and an input and output interface for the remote selection structure.

According to another feature the jukebox has a touch screen and an interface specific to the touch screen, an audio controller circuit and a video controller circuit of a display device belonging to the jukebox.

According to another feature the jukebox has a money changing device.

According to another feature the billing structure uses a database in the jukebox by linking the selected title to the selection cost and by delivering to a billing system a user identifier and the amount to be billed to him.

According to another feature of the invention the television screen enables display of a title selection menu allowing selections to be made either by direct access to the title or the performer, or by category and selection from a list of the category.

Another object of the invention is a process for using a distribution and selection system which does not require wiring.

This object is achieved with a system for distributing and selecting audio or video information including a television cable distribution network connected via an RF modulator and an audio controller card and a video controller card to a jukebox unit. The jukebox unit is in turn connected to another network, either by telephone or electrically by an interface. The method includes the following stages:

sending of an identifier from the premises associated with the television set either by telephone line or by remote control;

a stage of audio or video information selection to be executed on the network by using a keyboard and an interface which interprets pushing of the keys as cursor movements;

a stage wherein the order of selection and playing of the audio or video information is queued on the jukebox;

a stage wherein this information is sent over the cable network;

a stage wherein once the selection has been validated, information relating to user identification and selection cost is sent to a billing system.

BRIEF DESCRIPTION OF THE DRAWINGS

Other advantages and features of the invention will be discussed in the description below, with reference to the attached drawings, in which.

DETAILED DESCRIPTION OF PREFERRED EMBODIMENTS

Figure 1:
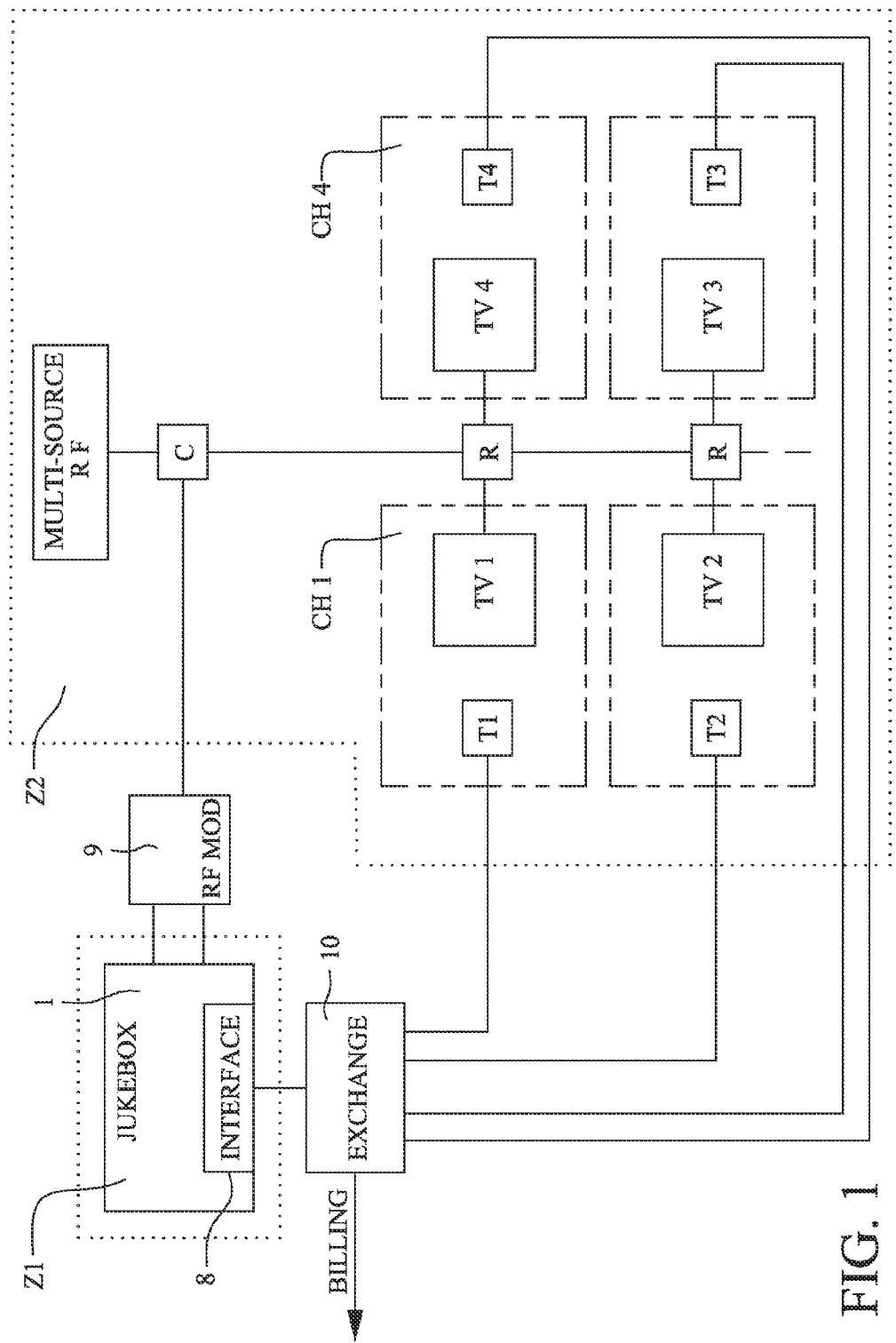
FIG. 1 shows a schematic of the network for distributing audio or video information.
Figure 2:
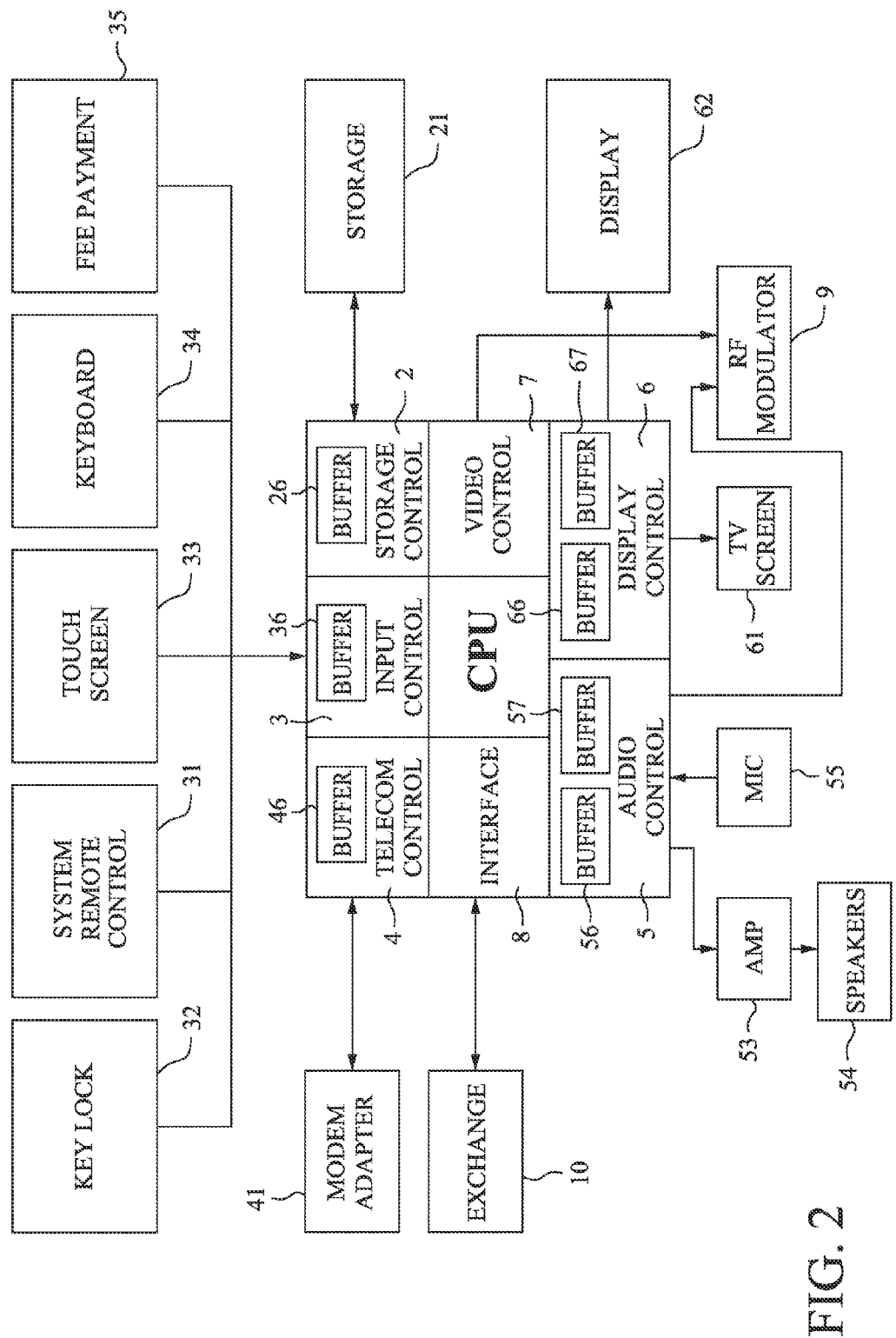
FIG. 2 shows a diagram of the circuits which comprise the jukebox of the invention.

The invention shown in FIG. 1 constitutes a jukebox unit (1) located in premises (Z1). This jukebox unit (1) is connected to a radio frequency modulator (9) which is connected to a coupler circuit C via a coaxial cable. Coupler circuit C via coaxial cable supplies distributors R which in turn are connected by coaxial cables to television sets (TV1, TV2, TV3, TV4). The coupler also receives on another of its inputs, via coaxial cable, a radio frequency source feed allowing distribution of ordinary television programs. Televisions are located in area (Z2) where each television is installed, for example, in a room. Television (TV1) is installed in the room (CH1), and this room (CH1) has a telephone set (T1) connected by a line to a telephone exchange (10) of the PABX type. This exchange (10) is in turn connected to a billing computer. Finally, exchange (10) is connected to an appropriate interface (8) of jukebox (1). Each room (CH2, CH3, CH4) which has television set (TV2, TV3, TV4) also has an associated telephone set (T2, T3, T4). Jukebox unit (1) is comprised of a central microprocessor unit CPU which is a high-performance PC-compatible system, the choice for the embodiment having fallen on an Intel 80486 DX/2 system which has storage means and the following characteristics:

compatibility with the local Vesa bus,
processor cache memory: 256 kO,
high performance parallel and serial ports,
SVGA-type microprocessor graphics adapter
type SCSI/2 bus controller,
32 MO battery backed-up static RAM.

Any other central processor with equivalent or better performance can be used in the invention.

This central processor unit controls and manages an audio control circuit (5), a telecommunications control circuit (4), an input control circuit (3), a mass storage control circuit (2) and a display control circuit (6). The display consists essentially of a 14 or 15 inch (35.56 cm) flat screen video monitor (62) without interleaving of the SVGA type, with high resolution and low radiation, which is used for image reproduction (for example, the covers of the albums of the musical selections), graphics or video clips.

A mass storage device (21) using high-speed, high-capacity SCSI-type hard disks is connected to the storage already present in the microprocessor device. This device is used to store digitized and compressed audiovisual information.

High-speed telecommunications modem adapter (41) of at least 28.8 Kbps is integrated to allow connection to a network for distribution of audiovisual information controlled by a central server.

The central processing unit (CPU) also controls and manages video controller circuit (7) connected by its output V2 to radio frequency modulator (9) which is also connected to an audio output of audio control circuit (5) which is independent of volume, tone and balance controls.

To reproduce audio data of musical selections, the system has loudspeakers (54) which receive the signal of an amplifier-tuner (53) linked to electronic circuit (5) of the music synthesizer type intended to support a large number of input sources while providing one output with CD (compact disk)-type quality, such as for example the microprocessor multimedia audio adapter of the "Sound Blaster" card type SBP32AWE by Creative Labs Inc to which two memory buffers (56, 57) are added for a purpose described below.

Likewise the display control circuit also has two buffer memories (66, 67) for a purpose described below.

Likewise additional video controller circuits (7) use these buffer (66, 67) circuits to transfer data between the hard disk and coaxial cable network.

A ventilated, thermally-controlled power supply of 240 watts delivers power to the system. This power supply is protected from surges and harmonics.

The audiovisual reproduction system manages via input controller circuit (3) an "Intelli Touch" 14-inch (35.56 cm) touch screen (33) from Elo Touch Systems Inc. which includes a glass coated board using "advanced surface wave technology" and an AT type bus controller. After having displayed on video monitor (62) or a television screen (61) various selection data used by the customers, this touch screen allows management command and control information used by the system manager or owner to be displayed as well. It is likewise used for maintenance purposes in combination with an external keyboard (34) which can be connected to a system which has a keyboard connector for this purpose, controlled by a key lock (32) via interface circuit (3).

Input circuit (3) likewise interfaces with a system remote control set (31) composed for example of:

an infrared remote control from Mind Path Technologies Inc., an emitter which has 15 control keys for the microprocessor system and 8 control keys for the projection device.

an infrared receiver with serial adapter from Mind Path Technologies Inc.

A fee payment device (35) from National Registers Inc. is likewise connected to input interface circuit (3). It is also possible to use any other device which allows receipt of any type of payment by coins, bills, tokens, magnetic chip cards or a combination of means of payment.

To house the circuits, each device has a chassis or frame of steel with external customizable fittings.

Besides these components, a microphone (55) is connected to audio controller (5) of each device. This allows its conversion into a powerful public address system or possibly a karaoke machine. Likewise a wireless loudspeaker system can be used by the system.

Remote control set (31) allows the manager, for example from behind the bar, to access and control various commands such as:
microphone start/stop command,
loudspeaker muting command,
audio volume control command;
command to cancel the musical selection being played.

Two buffers (56, 57) are connected to audio controller circuit (5) to allow each to store information corresponding to a quarter of a second of sound in alternation. Likewise two buffers (66, 67) are linked to each video controller circuit (6), each of which is able to store a tenth of a second of video each in alternation. Finally, respective buffer (46, 36, 26) is linked to each of the circuits for the communications controller (4), input interface (3), and storage (2).

The system operating software was developed around a library of tools and services largely oriented to the audiovisual domain in a multimedia environment. This library advantageously includes a powerful multitask operating system which effectively authorizes simultaneous execution of multiple fragments of code. This operating software thus allows concurrent execution—in an orderly manner and avoiding any conflict—of operations carried out on the display or audio reproduction structure as well as management of the telecommunications lines via the distribution network. In addition, the software has high flexibility.

The digitized and compressed audiovisual data are stored in storage device (21).

Each selection is available in two digitized formats: with hi-fi quality or CD quality.

The multitask operating system is the essential component for allowing simultaneous execution of multiple code fragments and for managing priorities between the various tasks which arise.

Figure 3:
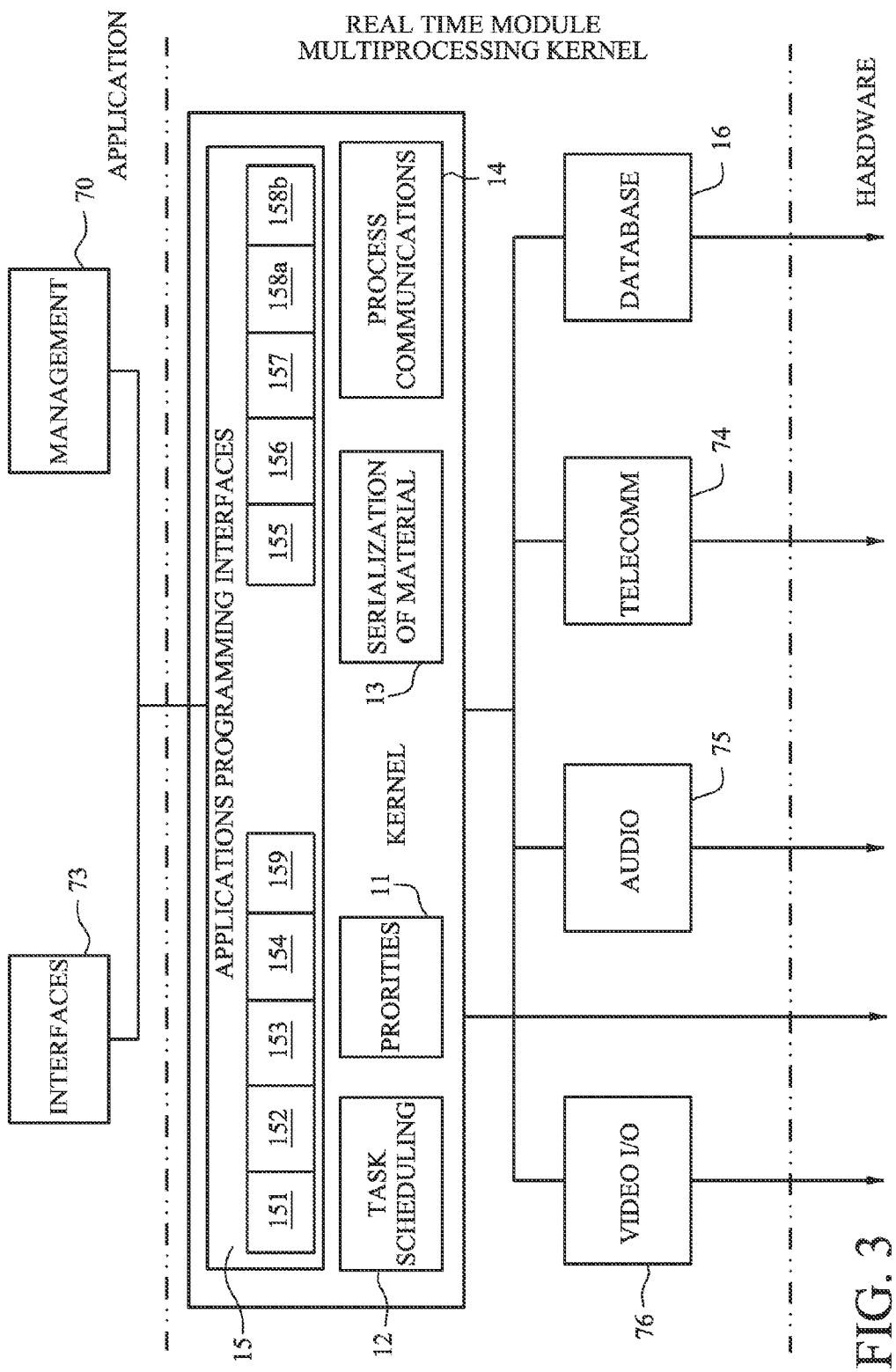
FIG. 3 shows the organization of the multitask system which manages all the hardware and software.

This multitask operating system is organized as shown in FIG. 3 around a kernel comprising a module (11) for resolving priorities between tasks, a task scheduling module (12), a module (13) for serialization of material used, and a process communications module (14). Each of the modules communicates with applications programming interfaces (15) and a database (16). There are as many programming interfaces as there are applications. Thus, module (15) includes a first programming interface (151) for key switch (32), a second programming interface (152) for remote control (31), a third programming interface (153) for touch screen (33), a fourth programming interface (154) for keyboard (34), a fifth programming interface (155) for payment device (35), a sixth programming interface (156) for audio control circuit (5), a seventh programming interface (157) for video control circuit (6), an eighth interface (159) for the video control circuit of the cable network and a last interface (158a) for telecommunications control circuit (4) and (158b) for PABX communications control circuit (10).

Five tasks with a decreasing order of priority are managed by the kernel of the operating system, the first (76) for the video inputs/outputs has the highest priority, the second (75) of level two relates to audio, the third (74) of level three to telecommunications, the fourth (73) of level four to interfaces and the fifth (70) of level five to management. These orders of priority will be considered by priority resolution module (11) as and when a task appears and disappears. Thus, as soon as a video task appears, the other tasks underway are suspended, priority is given to this task and all the resources are assigned to the video task. At the output, video task (76) is designed to unload the video files from mass memory (21) alternatively to one of two buffers (66, 67) while the other buffer (67 or 66 respectively) is used by video controller circuit (6) to produce the display after decompression of data. At the input, video task (76) is designed to transfer data received in telecommunications buffer (46) to mass memory (21). It is the same for audio task (75) on the one hand at the input between telecommunications buffer (46) and buffer (26) of mass memory (21) and on the other hand at the output between buffer (26) of mass memory (21) and one of two buffers (56, 57) of audio controller circuit (5).

Figure 4:
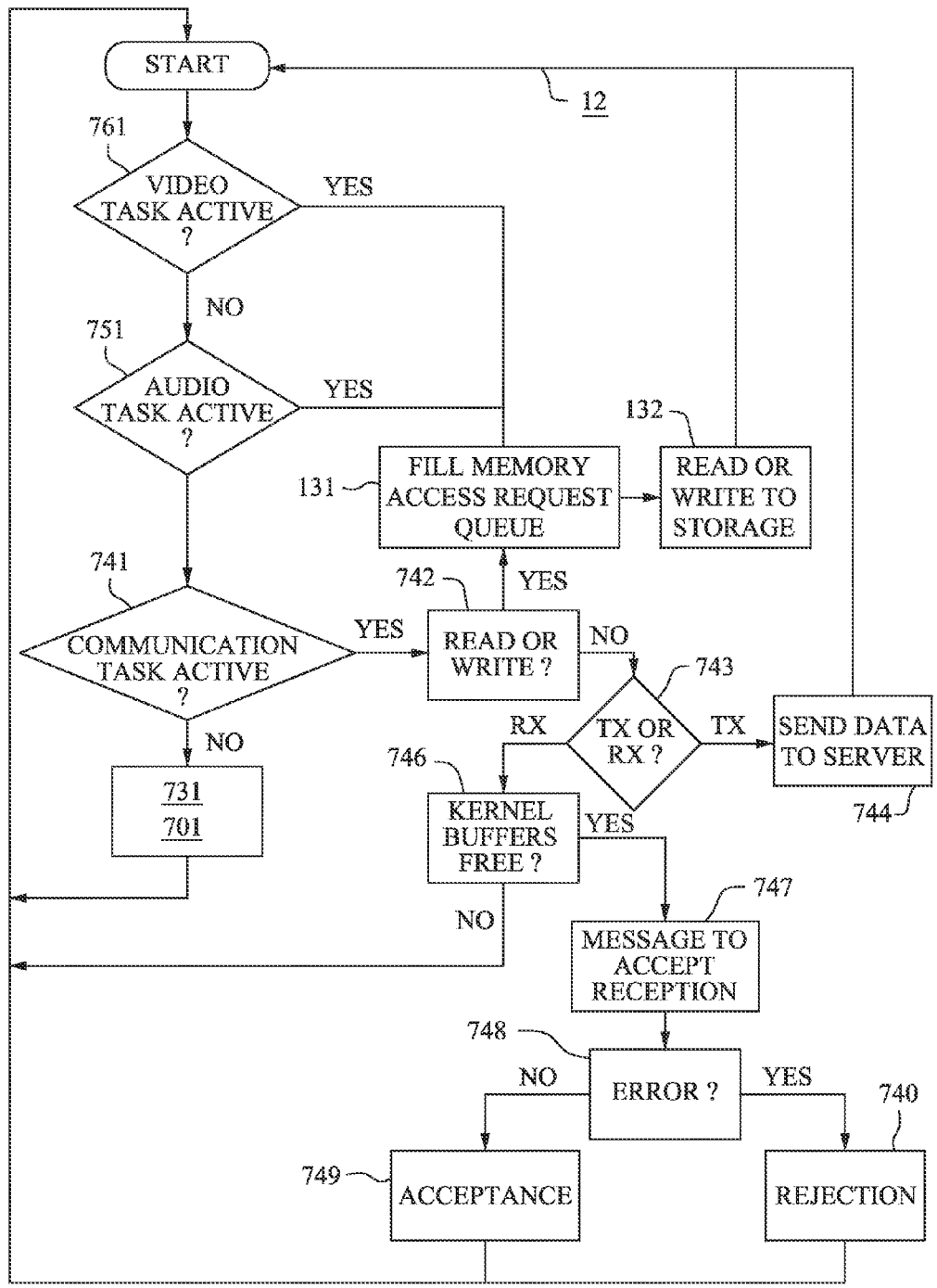
FIG. 4 shows a flowchart which describes how the multitask operating system functions.

Task scheduling module (12) will now be described in conjunction with FIG. 4. In the order of priority this module performs a first test (761) to determine if the video task is active, i.e., if one of video buffers (66, 67) is empty. In the case of a negative response the task scheduling module passes to the following test which is second test (751) to determine if the audio task is active, i.e., if one of buffers (56, 57) is empty. In the case of a negative response third test (741) determines if the communication task is active, i.e., if buffer (46) is empty. After a positive response to one of the tests, task scheduling module (12) at stage (131) fills memory access request queue (13) and at stage (132) executes this request by reading or writing between mass storage (21) and the buffer corresponding to the active task, then loops back to the first test. When test (741) on communications activity is affirmative, scheduler (12) performs test (742) to determine if it is a matter of reading or writing data in the memory. If yes, the read or write request is placed in a queue at stage (131). In the opposite case, the scheduler determines at stage (743) if it is transmission or reception and in the case of transmission sends by stage (744) a block of data to the central server. In the case of reception the scheduler verifies at stage (746) that the kernel buffers are free for access and in the affirmative sends a message to the central server to accept reception of a data block at stage (747). After receiving a block, an error check (748) of the cyclic redundancy check (CRC) type is executed. The block is rejected at stage (740) in case of error, or accepted in the opposite case at stage (749) by sending a corresponding message to the central server indicating that the block bearing a specific number is rejected or accepted, then loops back to the start tests. When there is no higher level task active, at stage (731 or 701) the scheduler processes interface or management tasks.

Figure 5:
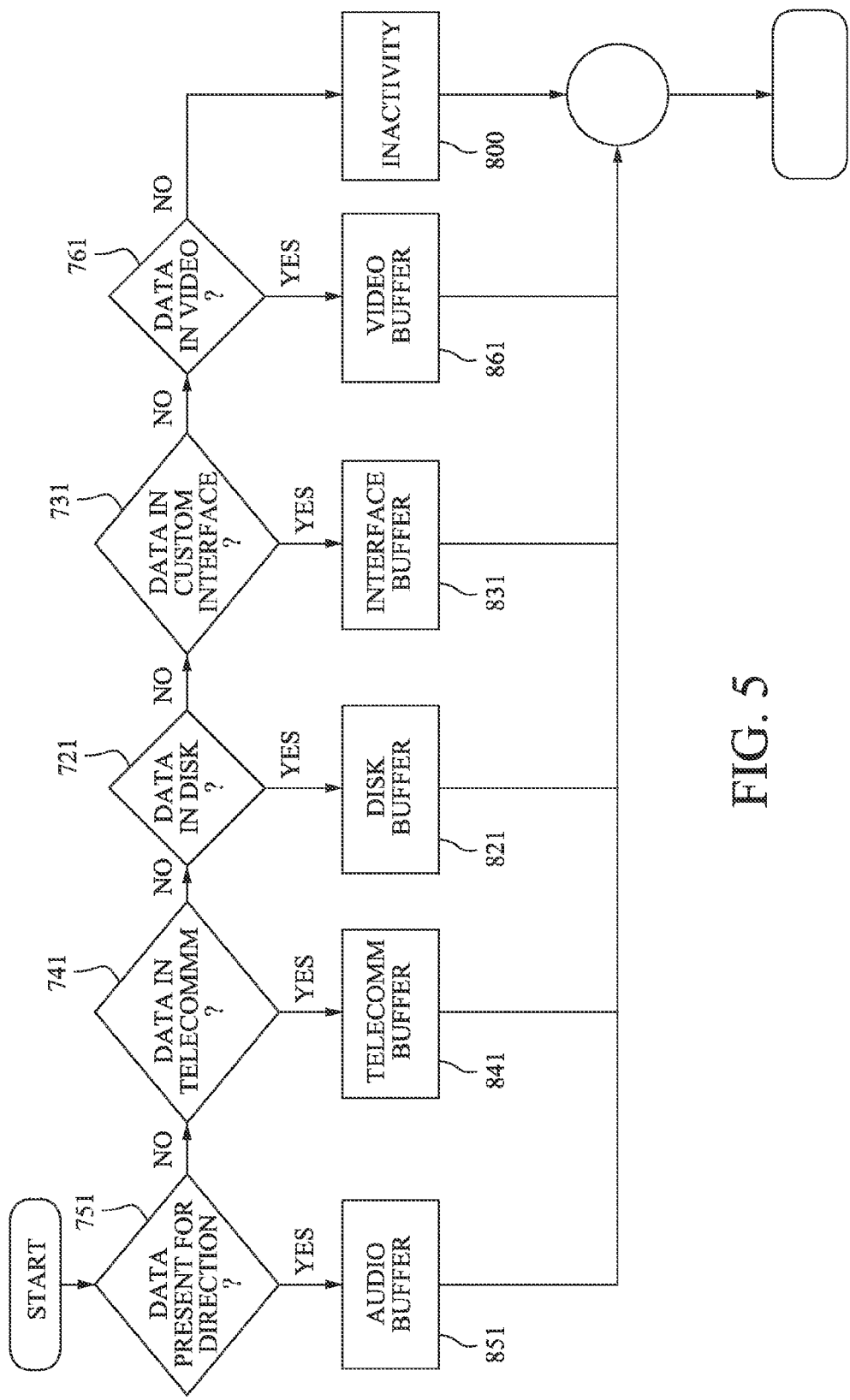
FIG. 5 shows a flowchart of verification of task activity.

Detection of an active task or ready task is done as shown in FIG. 5 by a test respectively (721 to 761) on each of the respective hardware or software buffers (26) of the hard disk, (36) of the interface, (46) of telecommunications, (56 and 57) of audio, (66 and 67) of video which are linked to each of respective controller circuits (2, 3, 4, 5, 6) of each of the hardware devices linked to central unit (1). Test (721) makes it possible to see whether the data are present in the input and output buffer of the disk, test (731) makes it possible to see whether data are present in the hardware or software buffers of the customer interface device, test (741) makes it possible to see whether data are present in the software or hardware buffers of the telecommunications device, test (751) makes it possible to determine whether data are present in the hardware or software buffer for direction, and test (761) makes it possible to see whether data are present in the hardware or software buffers of the video device. If one or more of these buffers are filled with data, scheduler (12) positions the respective status buffer or buffers (821) for the hard disk, (831) for the interface, (841) for telecommunications, (851) for audio, (861) for video corresponding to the hardware in a logic state indicative of the activity. In the opposite case the scheduler status buffers are returned at stage (800) to a value indicative of inactivity.

The operating status of the system is kept on the hard disk. Each time a notable event occurs, the system immediately registers it on the disk.

Thus, in the case in which an electrical fault or hardware failure occurs, the system will accordingly restart exactly at the same location where it had been interrupted.

Events which trigger back-up of the operating status are:
insertion of money (crediting);
addition of a selection to the queue;
end of a selection (change from the selection currently being played).

The file is then in a machine format which can only be read by the unit and does not occupy more than 64 octets.

Figure 6:
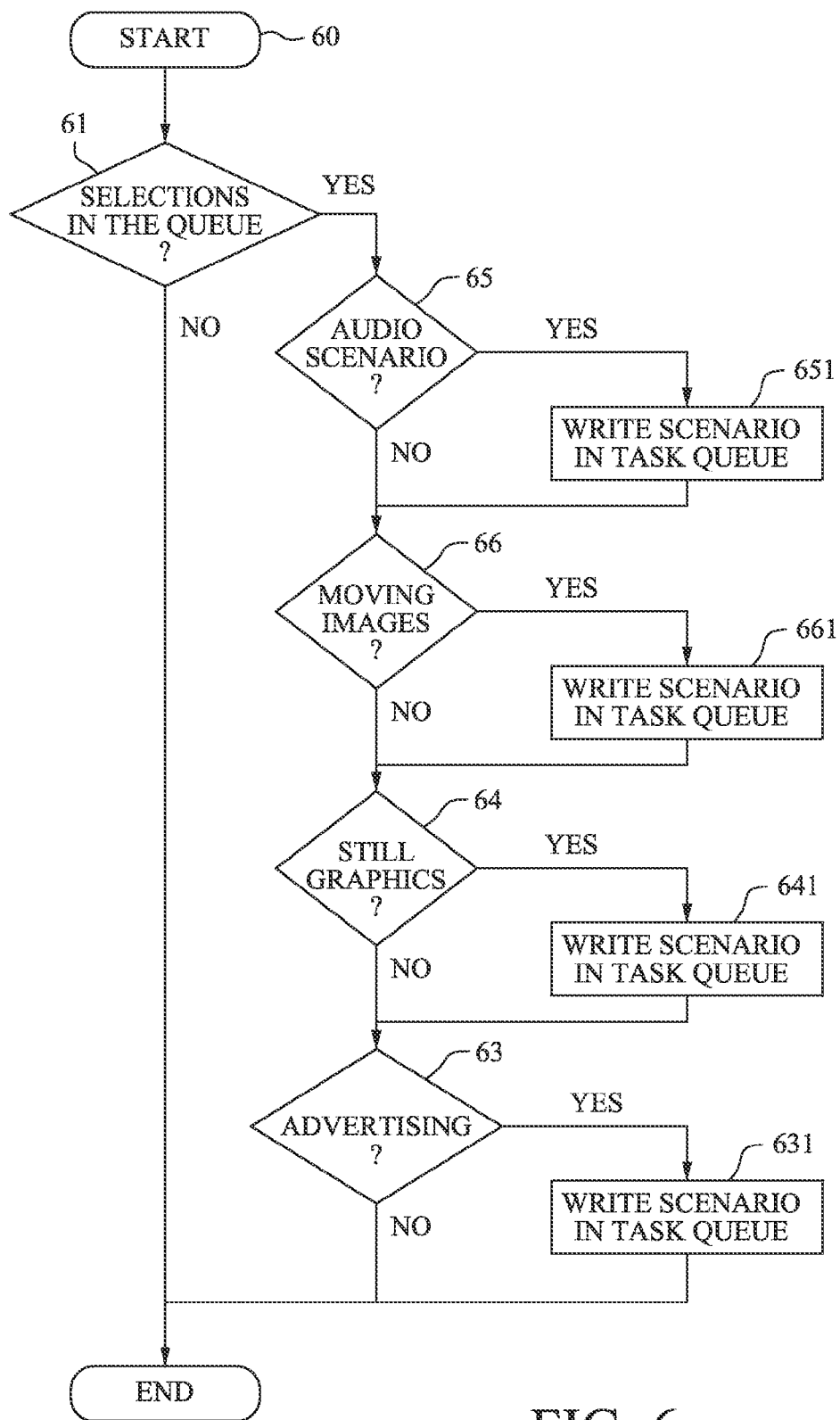
FIG. 6 shows the flowchart which describes task queuing.

The number and type of active tasks is indicated to scheduler (12) by execution of the selection management module SPMM whose flowchart is shown in FIG. 6. The management exercised by this module begins with test (61) to determine if selections are in the queue.

Consequently, if test (61) on the queue determines that selections are waiting, when a customer chooses a title he wishes to hear, it is automatically written in a queue file of the system on the hard disk.

Thus, any selection made will never be lost in case of an electrical failure. The system plays (reproduces) the selection in its entirety before removing it from the queue file.

When the selection has been reproduced in its entirety, it is removed from the queue file and written in the system statistics file with the date and time of purchase as well as the date and time at which it was played.

Immediately after transfer of the completed selection to the statistics file, the device checks if there are others in the queue file. If there is another, the device begins immediately to play the selection.

The total time elapsed between the end of one selection and the beginning of the next one is less than 0.5 seconds.

It is possible to extend this delay using a button located in the system control panel.

Processing continues with test (65) conducted to determine if the selection contains an audio scenario. If yes, at stage (651) this scenario is written in the task queue of scheduler (12). If no, or after this entry, processing is continued by test (66) to determine if the selection contains moving images. If yes, the video scenario is written at stage (661) in the task queue of scheduler (12). If no or if yes after this entry, processing is continued by test (64) to determine if the selection contains still graphics. If yes, at stage (641) this graphic presentation scenario is written in the task queue of scheduler (12). If no or if yes after this entry, processing is continued by test (63) to determine if the selection contains an advertising scenario. If yes, at stage (631) the scenario is written in the task queue of scheduler (12). Thus scheduler (12) notified of uncompleted tasks can manage the progression of tasks simultaneously.

Due on the one hand to the multitask management mode and on the other to the presence of hardware or software buffers assigned to each of the tasks to temporarily store data, it is possible to add management tasks of the video control modules for the coaxial network and of an interface with the telephone exchange on the premises without having to fundamentally modify functioning of a jukebox according to the invention. Moreover, operation of the telephone network in association with operation of the coaxial cable network on the premises makes it possible to broadcast music by the method according to the invention without having to make major modifications to the wiring on the premises and in the device allowing installation of the system.

In fact, in operation, a user, for example in room CH1, will take his set T1 and call a certain number corresponding to a imaginary room number allocated for use and selection of information to be broadcast on the coaxial network. When the PABX recognizes this number it sends a signal to interface (8) of jukebox (1) which triggers a task of selection of audio and video pieces to be broadcast. This selection task triggers transmission over the coaxial network of information which allows display corresponding to presentation windows which have selection boxes activated by a cursor moved by the actuation of certain buttons on the telephone. A software interface interprets the voice frequencies of the telephone buttons pressed to convert them into mouse events which can be interpreted by the operating system of the jukebox in such a way as to cause in association with these pushed buttons the movement of a marker on the windows shown on the television screens. This marker is moved on selection validation buttons in order to confirm the selection by pushing a button on the telephone keyboard specific to this action. The selection made by the user in this way in his room using the telephone and television screen, will be taken into account in the jukebox request queue just as the other selections made on the touch screen of the jukebox and will be interpreted and sent over the cable network when the time comes in order to be broadcast over all the television receivers in the building. In addition, during telephone communication the PABX exchange sent a room identification number to the jukebox. This latter sends via the PABX to the billing system the room number and cost of the selection(s) made so that the user can be billed directly for the musical or video pieces he has chosen.

Figure 7:
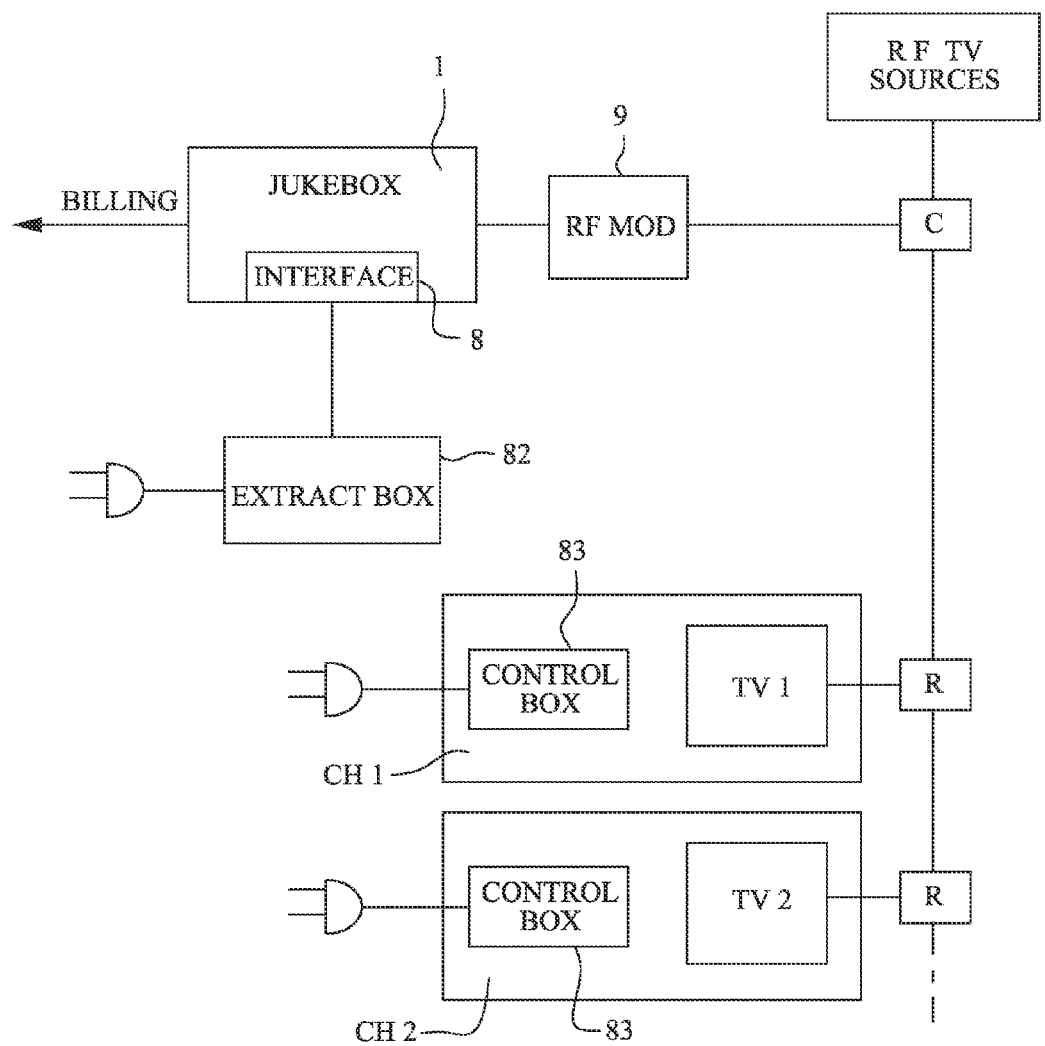
FIG. 7 shows a second embodiment of the network according to the invention.

Finally, the device shown in FIG. 7 is another embodiment of this invention featuring the cable network with its distributors (R), its coupler (C) and its different television sets (TV1, TV2), connected by coupler (C) to a radio frequency modulator (9) which in turn is connected to the stereo, audio and video output (V2) of jukebox (1). Jukebox (1) has interface (8) connected to box (82) plugged into the power grid. This box (82) is intended to extract from the current the control data which are superimposed on the carrier current. These control data are transmitted by control box (83) which in turn is connected to the grid by an electrical socket. The control box has either a mouse-type device or a trackball or joystick with a validation button to activate each time the presentation button of the screen on which the cursor or marker is moved via the movement component of the joystick, trackball or mouse type.

Any modification by one skilled in the art is likewise part of the invention.

The invention claimed is:

1. A system for distributing and selecting audiovisual items on a pre-existing coaxial cable network including a plurality of channels, comprising:

a jukebox device including a mass storage device to store a plurality of digitally compressed audiovisual items and running a multi-task operating system to manage a queue of selected items and to backup the operating status of the system when a predetermined event occurs, wherein the jukebox device communicates with the cable network via a dedicated channel of the plurality of channels, and further wherein the jukebox device is connected to a telephone switching system for receiving selection information for selecting one of said audiovisual items, said telephone switching system comprising a pre-existing telephone exchange of the PABX type, a plurality of television sets connected to the cable network for receiving a selected digital audiovisual item, a corresponding plurality of telephone sets, each being associated with the location of a television set and connected to said telephone switching system for transmitting said selection information, wherein the telephone switching system is configured to:
receive and recognize a specific call number dialed by any one of said telephone sets, and determine identification information identifying said dialing telephone set, call the jukebox device upon receiving the specific call number, and transmit to the jukebox device the identification information, and wherein the jukebox device is further configured, when receiving said identification information, to transmit audiovisual items corresponding to said selection information to the associated television set and wherein the jukebox device is the only component added to and modified in the pre-existing coaxial cable network and the pre-existing telephone exchange portions of the system that exist apart from the jukebox device to enable operation of each said task, and wherein said selection information is received as either voice frequencies or control data superimposed on a carrier current that is interpreted by a software interface as mouse events.

2. The system of claim 1, wherein the telephone switching system is further configured to transmit to the jukebox device validation information dialed by said dialing telephone set, said validation information being dialed to validate an audiovisual items selection information shown on the associated television set.

3. The system according to claim 1, wherein a selected audiovisual item will be added to the queue of selected items and will be broadcast for playback on all television receivers in the building tuned to the appropriate channel when the selected item comes up in queue.

4. The system of claim 1, further comprising a voice assistance module configured to guide a user in actuating appropriate keys of a telephone set.

5. A method for distributing and selecting audiovisual items on a coaxial cable network including a plurality of channels, the method comprising:
providing a jukebox including a mass storage device to store a plurality of digitally compressed audiovisual items and running a multi-task operating system to manage a queue of selected items and backup the operating status of the system when a predetermined event occurs, wherein the jukebox device communicates with the cable network via a dedicated channel of the plurality of channels, and further wherein the jukebox device is connected to a telephone switching system for receiving selection information for selecting one of said audiovisual items, said telephone switching system comprising a telephone exchange of the PABX type, providing a plurality of television sets connected to the cable network for receiving a selected audiovisual item, providing a corresponding plurality of telephone sets, respectively associated with the location of said television sets and connected to said telephone switching system for transmitting said selection information, dialing a specific call number by using any one of said telephone sets, then in said telephone switching system:
receiving and recognizing the dialed specific call number, determining identification information identifying said dialing telephone set, calling the jukebox device, when receiving such a specific call number, and transmitting to the jukebox device the identification information, the jukebox device then broadcasting, when receiving said identification information, audiovisual items corresponding to said selection information to the associated television set, wherein the jukebox is the only component added to the network already installed on the premises in order to enable implementation of said method, and wherein no components existing in the network prior to the jukebox being provided are modified to enable implementation of the method, and wherein said selection information is received as either voice frequencies or control data superimposed on a carrier current that is interpreted by a software interface as mouse events.

6. The method of claim 5, further comprising:
dialing a validation information for validating an audiovisual items selection information shown on the associated television set; and transmitting said validation information to the jukebox device via said telephone switching system.

7. The method according to claim 5, further including:
adding a selected audiovisual item to the queue of selected items; and broadcasting the selected item for playback on all television receivers in the building tuned to the appropriate channel when the selected item comes up in queue.

8. The method of claim 5, further comprising guiding, via a voice assistance module, a user in actuating appropriate keys of a telephone set.

9. A jukebox device at a location, comprising:
a multi-task operating system and hardware or software buffers assigned to each of the tasks that the multi-task operating system is configured to manage, an interface configured to be connected to a first network to receive a signal emitted by a signal emitting device, and allocated for use and selection of information to be sent on a coaxial cable network, a video controller circuit connected to the coaxial cable network by a modulator in order to broadcast, through a dedicated channel among a plurality of channels of said coaxial cable network, information representing presentation windows to be displayed on a television set associated with the location of said signal emitting device, a software interface for enabling selection, by using said signal emitting device, of an audio or video item among a plurality of audio or video items presented on presentation windows displayed on said television set, said software interface transmitting the selection to the jukebox to place it in the jukebox request queue to be sent on the coaxial cable network, wherein the jukebox device is connected to the first network and the coaxial cable network without having to re-wire either network at the location, and without having to update any components of either network, in order to directly enable operation of each said task, and wherein said selection information is received as either voice frequencies or control data superimposed on a carrier current that is interpreted by said software interface as mouse events.

10. The jukebox device according to claim 9, wherein signals emitted by signal emitting device are interpreted by the software interface of the jukebox as mouse events on said presentation windows for enabling selection of an audio or video item.

11. The jukebox device according to claim 9, wherein the first network is a telephone network associated with a PABX telephone exchange connected to a plurality of signal emitting devices, each signal emitting device being a telephone set associated with the location of a television set.

12. The jukebox device according to claim 11, wherein signals emitted through telephone network correspond to voice frequencies emitted by the telephone set.

13. The jukebox according to claim 9, wherein the first network is the power grid associated with a box connected to a plurality of signal emitting devices, each signal emitting device being a control box plugged into the power grid and associated with the location of a television set.

14. The jukebox according to claim 13, wherein signals emitted through the power grid are corresponding to current superimposed on the carrier current emitted by the control box and intended to be extracted by the box.

15. The jukebox device of claim 9, further comprising a voice assistance module configured to guide a user in actuating appropriate keys of a telephone set.

* * * * *